United States Patent
Krijn et al.

(10) Patent No.: US 8,330,881 B2
(45) Date of Patent: Dec. 11, 2012

(54) AUTOSTEREOSCOPIC DISPLAY DEVICE

(75) Inventors: Marcellinu Petrus Caro Michael Krijn, Eindhoven (NL); Emile Johannes Karel Verstegen, Eindhoven (NL); Peter-Andre Redert, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 364 days.

(21) Appl. No.: 12/097,778

(22) PCT Filed: Dec. 13, 2006

(86) PCT No.: PCT/IB2006/054815
§ 371 (c)(1),
(2), (4) Date: Jun. 17, 2008

(87) PCT Pub. No.: WO2007/072330
PCT Pub. Date: Jun. 28, 2007

(65) Prior Publication Data
US 2008/0259233 A1    Oct. 23, 2008

(30) Foreign Application Priority Data
Dec. 20, 2005   (EP) ................................. 05112494

(51) Int. Cl.
*G02F 1/1335*    (2006.01)
(52) U.S. Cl. .......................... 349/15; 349/200
(58) Field of Classification Search .............. 349/15, 349/200
See application file for complete search history.

(56) References Cited

U.S. PATENT DOCUMENTS

| 5,036,385 | A | * | 7/1991 | Eichenlaub ................. 348/59 |
| 5,349,379 | A | | 9/1994 | Eichenlaub |
| 5,493,427 | A | | 2/1996 | Nomura et al. |
| 6,049,424 | A | * | 4/2000 | Hamagishi ................. 359/464 |
| 6,069,650 | A | | 5/2000 | Battersby |
| 6,137,456 | A | | 10/2000 | Bhagavatula et al. |
| 2001/0038360 | A1 | * | 11/2001 | Fukushima et al. ............ 345/8 |
| 2005/0057702 | A1 | | 3/2005 | Cho et al. |
| 2005/0248705 | A1 | | 11/2005 | Smith et al. |

FOREIGN PATENT DOCUMENTS

| WO | 2004070467 A2 | 8/2004 |
| WO | 2004075526 A2 | 9/2004 |

* cited by examiner

*Primary Examiner* — Michael Caley
(74) *Attorney, Agent, or Firm* — Larry Liberchuk (57) ABSTRACT

A switchable autostereoscopic display device comprises a display panel having an array of display pixel elements for producing a display, the display pixel elements being arranged in rows and columns. An imaging arrangement directs the output from different pixel elements to different spatial positions to enable a stereoscopic image to be viewed. The imaging arrangement is electrically switchable between at two 3D modes, wherein the effective position of the imaging arrangement is shifted laterally between the modes with respect to the display pixel elements by an amount which is a non-integer multiple of the pitch between the pixel elements. These two modes enable the resolution per mode to be increased, by adding views at inter-pixel locations, or enables the number of views to be increased.

14 Claims, 12 Drawing Sheets

AUTOSTEREOSCOPIC DISPLAY DEVICE

This invention relates to an autostereoscopic display device of the type that comprises a display panel having an array of display pixels for producing a display and an imaging arrangement for directing different views to different spatial positions.

A first example of an imaging arrangement for use in this type of display is a barrier, for example with slits that are sized and positioned in relation to the underlying pixels of the display. The viewer is able to perceive a 3D image if his/her head is at a fixed position. The barrier is positioned in front of the display panel and is designed so that light from the odd and even pixel columns is directed towards the left and right eye of the viewer.

A drawback of this type of two-view display design is that the viewer has to be at a fixed position, and can only move approximately 3 cm to the left or right. In a more preferred embodiment there are not two sub-pixel columns beneath each slit, but several. In this way, the viewer is allowed to move to the left and right and perceive a stereo image in his eyes all the time.

The barrier arrangement is simple to produce but is not light efficient. A preferred alternative is therefore to use a lens arrangement as the imaging arrangement. For example, an array of elongate lenticular elements can be provided extending parallel to one another and overlying the display pixel array, and the display pixels are observed through these lenticular elements.

The lenticular elements are provided as a sheet of elements, each of which comprises an elongate semi-cylindrical lens element. The lenticular elements extend in the column direction of the display panel, with each lenticular element overlying a respective group of two or more adjacent columns of display pixels.

In an arrangement in which, for example, each lenticule is associated with two columns of display pixels, the display pixels in each column provide a vertical slice of a respective two dimensional sub-image. The lenticular sheet directs these two slices and corresponding slices from the display pixel columns associated with the other lenticules, to the left and right eyes of a user positioned in front of the sheet, so that the user observes a single stereoscopic image. The sheet of lenticular elements thus provides a light output directing function.

In other arrangements, each lenticule is associated with a group of four or more adjacent display pixels in the row direction. Corresponding columns of display pixels in each group are arranged appropriately to provide a vertical slice from a respective two dimensional sub-image. As a user's head is moved from left to right, a series of successive, different, stereoscopic views are perceived creating, for example, a look-around impression.

The above described device provides an effective three dimensional display. However, it will be appreciated that, in order to provide stereoscopic views, there is a necessary sacrifice in the horizontal resolution of the device. This sacrifice in resolution is unacceptable for certain applications, such as the display of small text characters for viewing from short distances. For this reason, it has been proposed to provide a display device that is switchable between a two-dimensional mode and a three-dimensional (stereoscopic) mode.

One way to implement this is to provide an electrically switchable lenticular array. In the two-dimensional mode, the lenticular elements of the switchable device operate in a "pass through" mode, i.e. they act in the same way as would a planar sheet of optically transparent material. The resulting display has a high resolution, equal to the native resolution of the display panel, which is suitable for the display of small text characters from short viewing distances. The two-dimensional display mode cannot, of course, provide a stereoscopic image.

In the three-dimensional mode, the lenticular elements of the switchable device provide a light output directing function, as described above. The resulting display is capable of providing stereoscopic images, but has the inevitable resolution loss mentioned above.

In order to provide switchable display modes, the lenticular elements of the switchable device are formed of an electro-optic material, such as a liquid crystal material, having a refractive index that is switchable between two values. The device is then switched between the modes by applying an appropriate electrical potential to planar electrodes provided above and below the lenticular elements. The electrical potential alters the refractive index of the lenticular elements in relation to that of an adjacent optically transparent layer. A more detailed description of the structure and operation of the switchable device can be found in U.S. Pat. No. 6,069,650.

For the 3D mode of operation, a major dilemma is caused by the fact that on the one hand a large number of views per angle is needed for a good 3D impression and on the other hand a small number of views is needed for a sufficiently high resolution (i.e. number of pixels) per view.

A low number of perspective views will give a shallow 3D image with little perception of depth. The larger the number of views per angle, the more the perception of 3D will resemble that of a truly 3D image such as for example a holographic image. Concentrating all the views within a small angle will give a good 3D impression but a limited viewing angle.

A major drawback of using a high number of views is that the image resolution per view is reduced. The total number of available pixels has to be distributed among the views. In the case of an n-view 3D display with vertical lenticular lenses, the perceived resolution of each view along the horizontal direction will be reduced by a factor of n relative to the 2D case. In the vertical direction the resolution will remain the same. The use of a barrier or lenticular that is slanted can reduce this disparity between resolution in the horizontal and vertical direction. In that case, the resolution loss can be distributed evenly between the horizontal and vertical directions.

Increasing the number of views thus improves the 3D impression but reduces the image resolution as perceived by the viewer. There is therefore a desire to increase the resolution per view in such an arrangement.

According to the invention, there is provided a switchable autostereoscopic display device comprising:

a display panel having an array of display pixel elements for producing a display, the display pixel elements being arranged in rows and columns; and an imaging arrangement which directs the output from different pixel elements to different spatial positions to enable a stereoscopic image to be viewed, wherein the imaging arrangement is electrically switchable between at least two 3D modes, wherein the effective position of the imaging arrangement is shifted laterally between the modes with respect to the display pixel elements by an amount which is a non-integer multiple of the pitch between the pixel elements.

These two modes enable the resolution per mode to be increased, by adding views at inter-pixel locations, or enable the number of views to be increased. This enables the loss of performance resulting from the generation of 3D images to be reduced. The amount of shift may comprise half the pitch between the pixel elements. The display pixel elements may comprise sub-pixels of a color pixel triplet.

The imaging arrangement may further be switchable to a 2D mode.

In one example, the imaging arrangement comprises a controllable light source device for illuminating the display panel.

In a more preferred example, a controllable light barrier device is provided for controlling the light reaching the display panel from a backlight.

The imaging arrangement may then comprise a matrix addressable liquid crystal light modulator device for providing an electrically controllable light absorption or reflection pattern to provide a light blocking function, thereby to implement a controllable light directing function.

The use of barrier devices reduces the light output, and in a more preferred implementation, the imaging arrangement comprises a controllable lens device, for example an electrically configurable graded index lens array.

In this case, the lens array can comprise a layer of liquid crystal material sandwiched between first and second electrode layers for controlling the potential across the liquid crystal layer.

At least one of the electrode layers can comprise an array of individually addressable parallel electrodes. The electrode pitch is then preferably a fraction of the pixel element pitch.

The invention also provides a method of controlling an autostereoscopic display device comprising a display panel and an imaging arrangement for directing the display panel output to different spatial positions to enable a stereoscopic image to be viewed, the method comprising:

displaying a first set of views using the imaging arrangement;

shifting the effective position of the imaging arrangement laterally with respect to the display pixel elements by an amount which is a non-integer multiple of the pitch between the pixel elements; and displaying a second set of views using the imaging arrangement.

An embodiment of the invention will now be described, purely by way of example, with reference to the accompanying drawings, in which:

FIGS. 11 (a) and (b) show an alternative way to use the barrier arrangement of the invention;

The invention provides a switchable autostereoscopic display device in which an imaging arrangement directs the output from different pixels to different spatial positions to enable a stereoscopic image to be viewed. These may be lenses, barriers or directed light sources. The imaging arrangement is electrically switchable between two 3D modes, in order to enable the resolution or number of images to be increased using a time multiplex approach.

Figure 1:
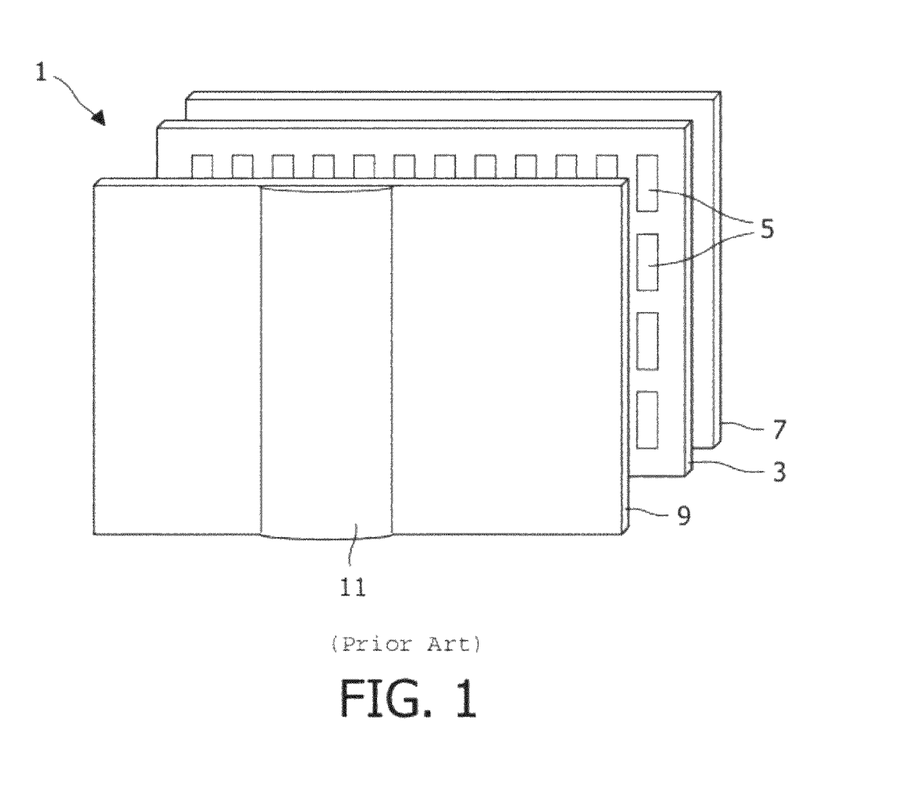
FIG. 1 is a schematic perspective view of a known autostereoscopic display device.

FIG. 1 is a schematic perspective view of a known direct view autostereoscopic display device 1. The known device 1 comprises a liquid crystal display panel 3 of the active matrix type that acts as a spatial light modulator to produce the display.

The display panel 3 has an orthogonal array of display pixels 5 arranged in rows and columns. For the sake of clarity, only a small number of display pixels 5 are shown in the figure. In practice, the display panel 3 might comprise about one thousand rows and several thousand columns of display pixels 5.

The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarizing layers are also provided on the outer surfaces of the substrates.

Each display pixel 5 comprises opposing electrodes on the substrates, with the intervening liquid crystal material therebetween. The shape and layout of the display pixels 5 are determined by the shape and layout of the electrodes. The display pixels 5 are regularly spaced from one another by gaps.

Each display pixel 5 is associated with a switching element, such as a thin film transistor (TFT) or thin film diode (TFD). The display pixels are operated to produce the display by providing addressing signals to the switching elements, and suitable addressing schemes will be known to those skilled in the art.

The display panel 3 is illuminated by a light source 7 comprising, in this case, a planar backlight extending over the area of the display pixel array. Light from the light source 7 is directed through the display panel 3, with the individual display pixels 5 being driven to modulate the light and produce the display.

The display device 1 also comprises a lenticular sheet 9, arranged over the display side of the display panel 3, which performs a view forming function. The lenticular sheet 9 comprises a row of lenticular elements 11 extending parallel to one another, of which only one is shown with exaggerated dimensions for the sake of clarity.

The lenticular elements 11 are in the form of convex cylindrical lenses, and they act as a light output directing means to provide different images, or views, from the display panel 3 to the eyes of a user positioned in front of the display device 1.

The autostereoscopic display device 1 shown in FIG. 1 is capable of providing several different perspective views in different directions. In particular, each lenticular element 11 overlies a small group of display pixels 5 in each row. The lenticular element 11 projects each display pixel 5 of a group in a different direction, so as to form the several different views. As the user's head moves from left to right, his/her eyes will receive different ones of the several views, in turn.

It has been proposed to provide electrically switchable lens elements, as mentioned above. This enables the display to be switched between 2D and 3D modes.

Figure 2:
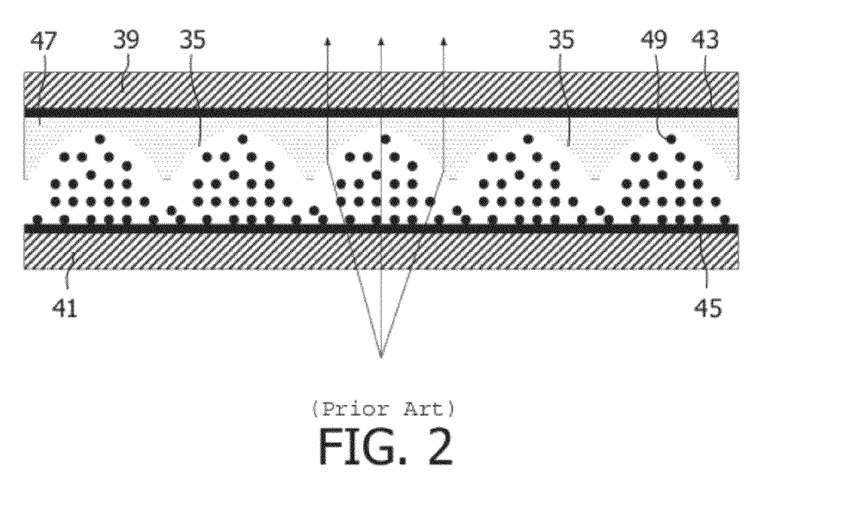
FIGS. 2 and 3 are used to explain the operating principle of the lens array of the display device shown in FIG. 1.
Figure 3:
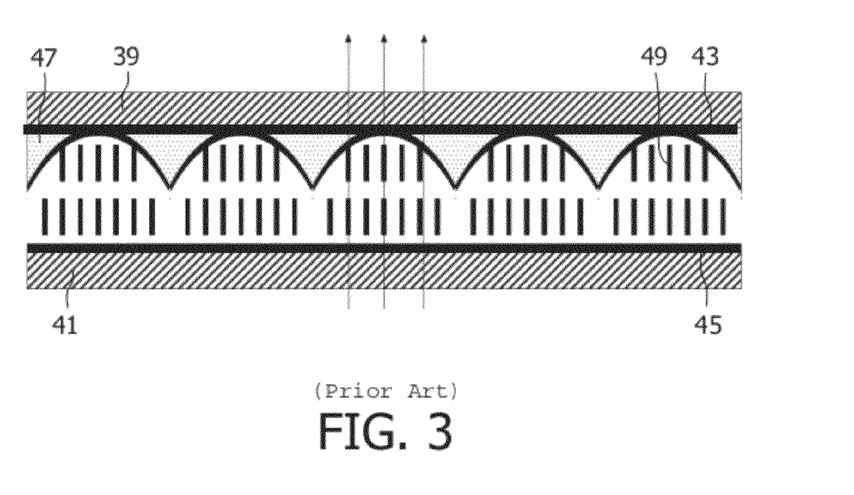

FIGS. 2 and 3 schematically show an array of electrically switchable lenticular elements 35 which can be employed in the device shown in FIG. 1. The array comprises a pair of transparent glass substrates 39, 41, with transparent electrodes 43, 45 formed of indium tin oxide (ITO) provided on their facing surfaces. An inverse lens structure 47, formed using a replication technique, is provided between the substrates 39, 41, adjacent to an upper one of the substrates 39. Liquid crystal material 49 is also provided between the substrates 39, 41, adjacent to the lower one of the substrates 41.

The inverse lens structure 47 causes the liquid crystal material 49 to assume parallel, elongate lenticular shapes, between the inverse lens structure 47 and the lower substrate 41, as shown in cross-section in FIGS. 2 and 3. Surfaces of the inverse lens structure 47 and the lower substrate 41 that are in contact with the liquid crystal material are also provided with an orientation layer (not shown) for orientating the liquid crystal material.

FIG. 2 shows the array when no electric potential is applied to the electrodes 43, 45. In this state, the refractive index of the liquid crystal material 49 for light of a particular polarization is substantially higher than that of the inverse lens array 47, and the lenticular shapes therefore provide a light output directing function, i.e. a lens action, as illustrated.

FIG. 3 shows the array when an alternating electric potential of approximately 50 to 100 volts is applied to the electrodes 43, 45. In this state, the refractive index of the liquid crystal material 49 for light of the particular polarization is substantially the same as that of the inverse lens array 47, so that the light output directing function of the lenticular shapes is cancelled, as illustrated. Thus, in this state, the array effectively acts in a "pass through" mode.

The skilled person will appreciate that a light polarizing means must be used in conjunction with the above described array, since the liquid crystal material is birefringent, with the refractive index switching only applying to light of a particular polarization. The light polarizing means may be provided as part of the display panel or the imaging arrangement of the device.

Further details of the structure and operation of arrays of switchable lenticular elements suitable for use in the display device shown in FIG. 1 can be found in U.S. Pat. No. 6,069,650.

Figure 4:
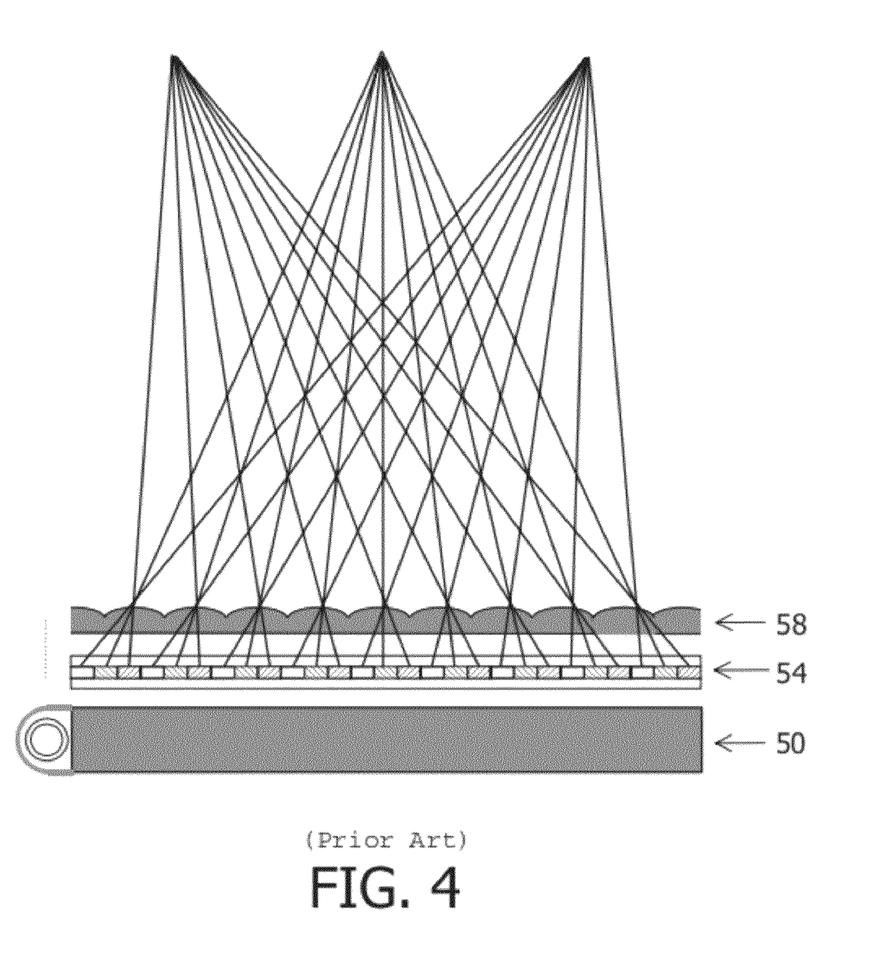
FIG. 4 shows how a lenticular array provides different views to different spatial locations.
Figure 5:
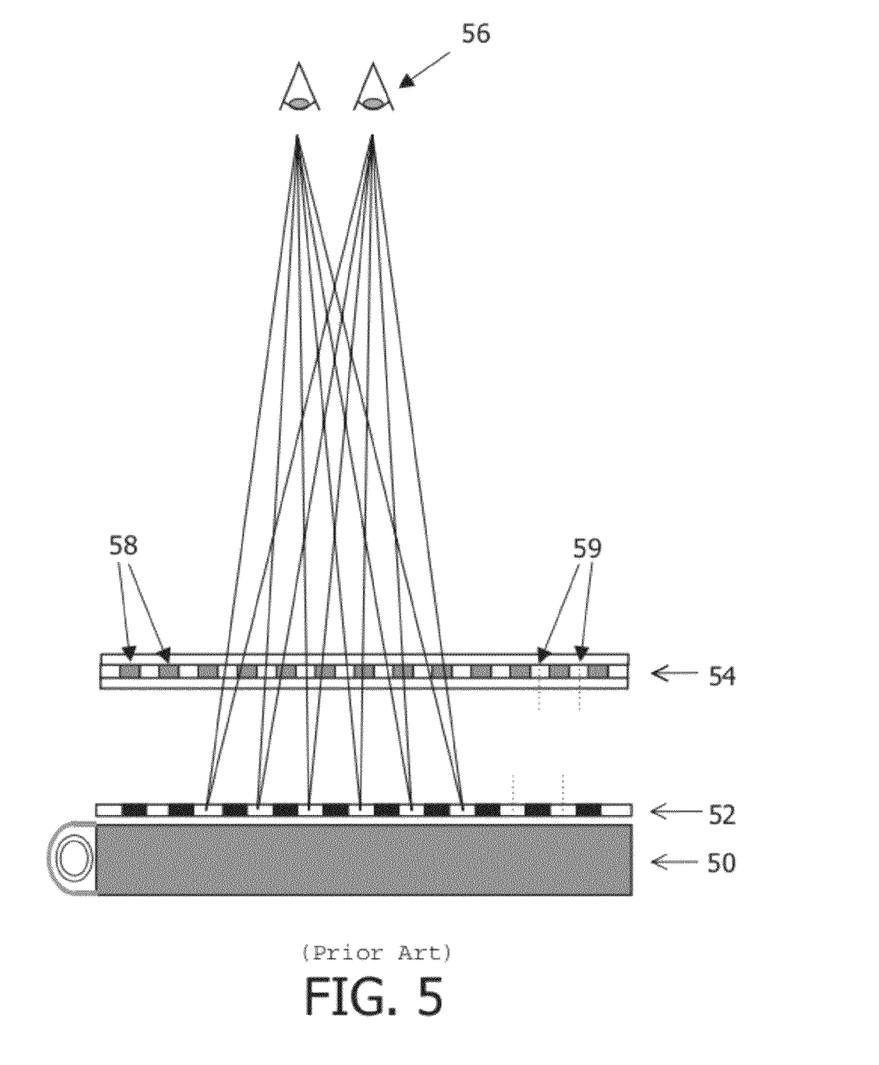
FIG. 5 shows how a barrier arrangement provides different views to different spatial locations.

FIG. 4 shows the principle of operation of a lenticular type imaging arrangement as described above and shows the backlight 50, display device 54 such as an LCD and the lenticular array 58. FIG. 5 shows how the lenticular arrangement 58 directs different pixel outputs to different spatial locations.

FIG. 5 shows the principle of operation of a barrier type imaging arrangement showing the backlight 50, barrier device 52 and display device 54 such as an LCD. FIG. 5 shows how the barrier device 52 provides a patterned light output. This means that different pixels are illuminated by discontinuous light source regions, with the effect that a light directing function is implemented. As shown, pixels 58 for one view are illuminated from one direction and pixels 59 for another view are illuminated from another direction. The two eyes 56 of the viewer receive light modulated by different pixels of the display.

Figure 6:
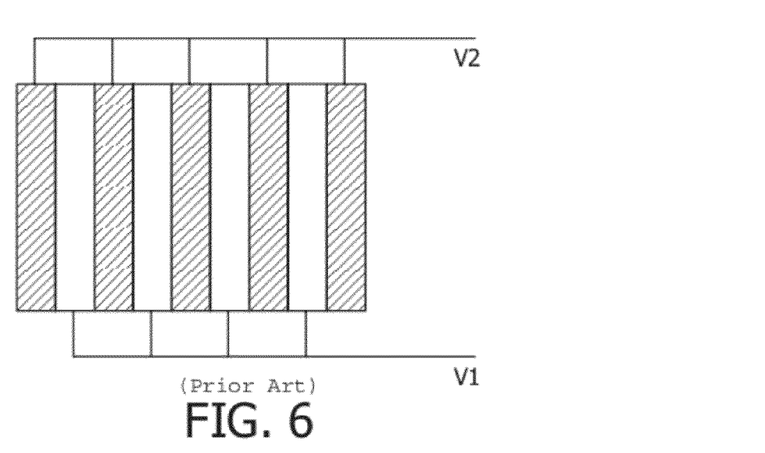
FIG. 6 shows a known barrier arrangement.

The known barrier arrangement of FIG. 5 is shown in FIG. 6 and consists of a simple passive matrix liquid crystal (LC) panel with a simple electrode structure. The electrodes on one of two glass plates are arranged in columns. The LC material underneath the electrodes can be switched such that, with help of polarizers, the light can be transmitted or blocked. In such a way, a switchable barrier pattern is obtained that enables a 2-view or multi-view display that can be switched between a certain 3D mode and a 2D mode. The invention provides mechanisms for increasing the resolution per view, using the imaging device, such as a lenticular arrangement or a barrier arrangement.

Figure 7:
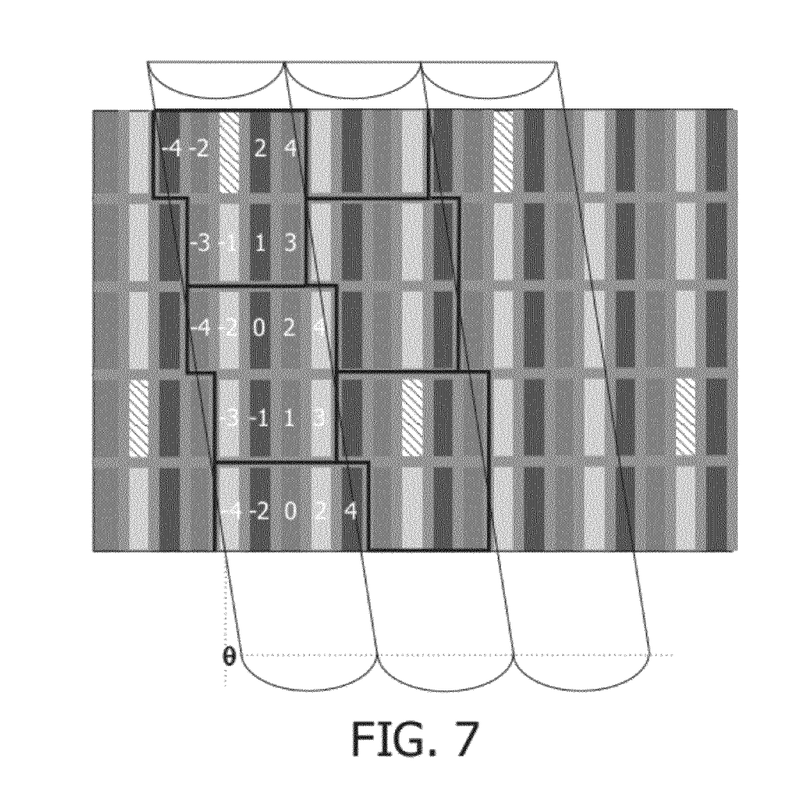
FIG. 7 is used to explain the benefit of a slanted focusing arrangement.

By way of example, FIG. 7 shows the sub-pixel layout of a 9-view display, and which uses slanted lenticular lenses. The columns are arranged as red, green and blue columns of sub pixels in sequence, and three overlying lenticular lenses are shown. The numbers shown refer to the view number which the sub-pixels contribute to, with the views numbered from −4 to +4, with view 0 along the lens axis. When the aspect ratio of the sub-pixels is 1:3 as in this example (each pixel comprises a row of three sub-pixels) the optimum slant angle is $\tan(\theta)=\frac{1}{6}$. As a result, the perceived resolution loss per view (compared to the 2D case) is a factor of 3 in both the horizontal and vertical direction instead of a factor of 9 in the horizontal direction when the slant angle is zero. The occurrence of dark bands resulting from the black matrix is also largely suppressed. The black matrix would be very visible (dark bands) when $\tan(\theta)=0$ or $\tan(\theta)=\frac{1}{3}$.

The approach provided by the invention will be described with reference to the 9-view color display shown in FIG. 7.

A first approach is to increase the resolution of each image.

The locations of sub-pixels of a certain color in a certain view are separated rather far apart. This is perceived as a resolution loss compared to the resolution of a regular 2D display. As an example, in FIG. 7, the locations of the green sub-pixels contributing to view zero are shown as the hatched rectangles.

By shifting the lenticular in a time-sequential manner with respect to the LCD, the empty spaces between the hatched sub-pixels can be filled. For example, by shifting the lenticular to the left and right by 1½ sub-pixels, all the green sub-pixels in the first row of sub-pixels in FIG. 7 can contribute to view zero. In effect, the resolution in the horizontal direction can be tripled.

The invention provides an increase in the resolution of each view by essentially shifting the view-forming element (lens or barrier) with respect to the image-forming element (display) in a time-sequential manner. For example, in case the frame rate is 100 Hz, the view-forming element could alternate between two positions. The positions are switched after every 1/100-second. In this manner, the resolution per view can be doubled. The shifting is implemented by electrical control of the configuration rather than mechanical control, as will be apparent from the description below.

Instead of doubling the resolution per view, it is also possible to triple the resolution per view. Shifting the image-forming element to the left and to the right of its original position can accomplish this.

In theory, an n-fold increase of the resolution is possible for an n-view system: in the case of an n-view system, time-multiplexing by a factor of n is needed to re-obtain for each view the resolution available in the 2D mode.

The demands on the frame rate are not very high. For example, time-multiplexing by a factor of two in order to double the resolution per view does not necessarily imply that the frame rate has to be doubled. In the case of a frame rate of 50 Hz, images are generated for each of the two positions of the view-forming element at a frame rate of 25 Hz only. Since the images that are generated for the two positions are very similar, in the perception of the viewer the perceived frame rate is still 50 Hz rather than 25 Hz.

Upon shifting the lenticular or barrier arrangement, the image content for each view needs to be adapted accordingly, for example by interpolation/extrapolation of the image content of the original views.

A second approach is to keep the resolution as is, and instead increase (for example double) the number of views.

Figure 8A:
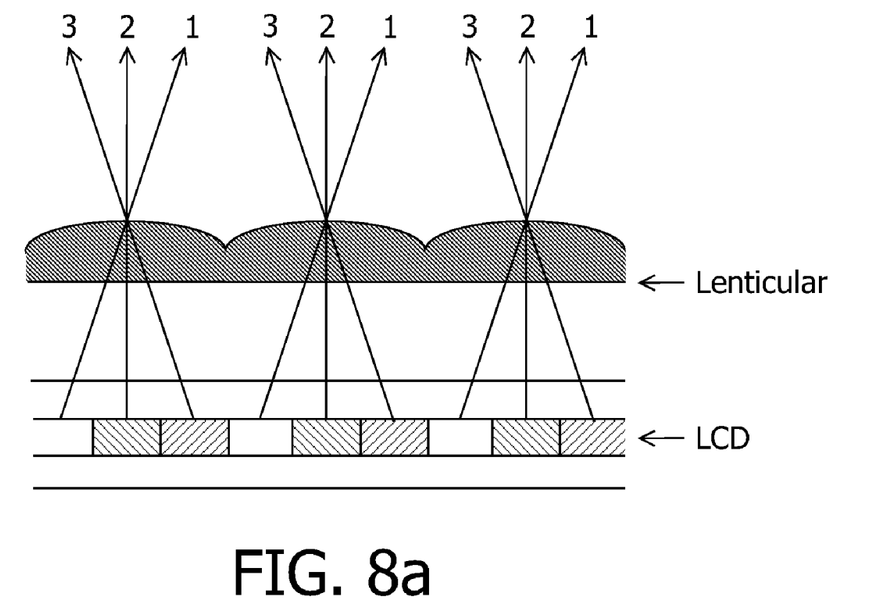
FIG. 8 is used to explain the method of the invention.
Figure 8B:
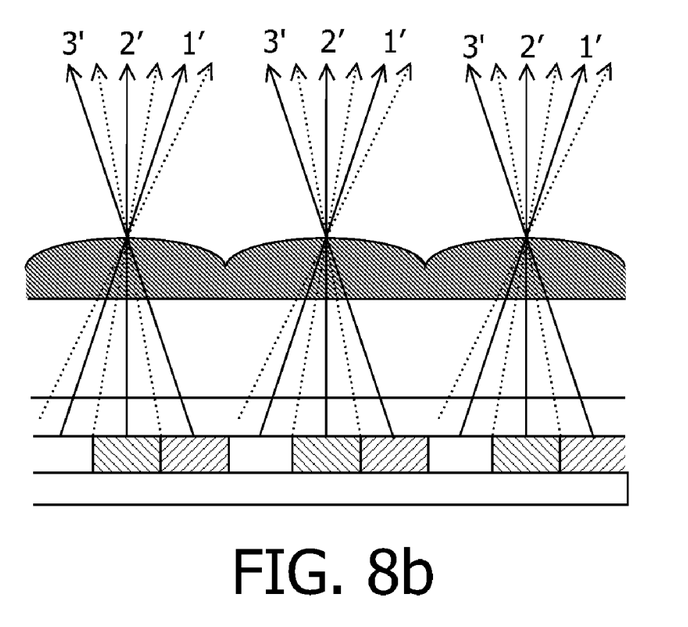

This is explained with reference to FIG. 8, in which FIG. 8(a) shows a known layout of pixels in the image forming element (LCD) and layout of the view-forming element (lenticular). FIG. 8(b) shows an embodiment according to the invention: The lenticular is shifted to the left by half the width of a sub-pixel. The views created by the shifted lenticular are located between the original views.

FIG. 8 shows a simple monochrome (e.g. black-and-white) 3-view display based on an LCD and a lenticular in front. Three views are generated as shown in FIG. 8(a) (views 1, 2, 3). By shifting the lenticular in the lateral direction by half the pixel pitch (to either side), three views are still created (views 1', 2', 3'). However, the views are oriented in directions that are in between the original view directions. For example, if the original views are directed at angles −4°, 0°, 4°, shifting the lenticular to the left with respect to the LCD panel results in views directed at angles −6°, −2°, 2°.

In this way, the number of views can be doubled by shifting the lenticular in a lateral direction substantially perpendicular to the orientation of the cylinder lenses.

If the position of the view-forming element is switched after every 1/100 second in order to double the number of views, then in the case of an n-view display, 2n views are generated in two groups of n views. Each group is shown at a frame rate of 50 Hz. A frame rate of 50 Hz per group of views is the minimum acceptable frame rate, as a lower frame rate would result in annoying frame flicker.

Doubling the number of views has only limited value if the pixels of the image-forming element are located next to each other with no spacing in between, in this case, the individual views have no spacing between them.

Figure 9A:
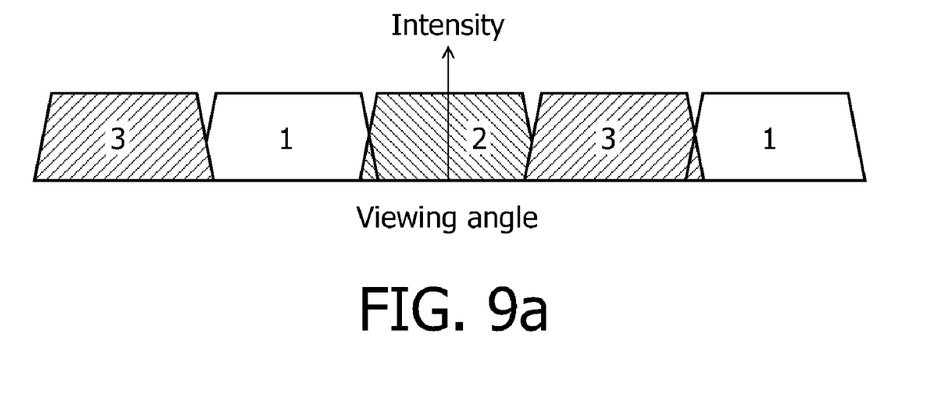
FIG. 9 shows the effect of the black mask layer on adjacent views.
Figure 9B:
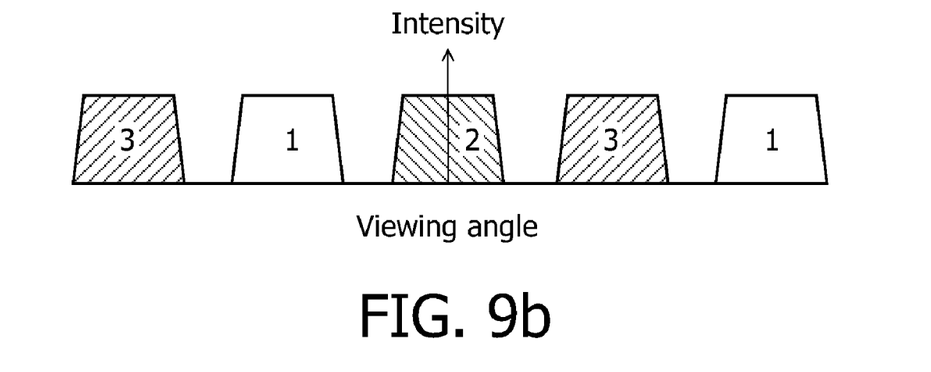

FIG. 9 shows intensities of light within a certain view, as a function of angle for a three-view system with slant angle zero. FIG. 9(a) shows the view overlap when there is no black matrix and FIG. 9(b) shows the view separation provided by black matrix between the pixels.

As shown in FIG. 9(a), additional views can then overlap with the original views. In practice, there is a black matrix (as mentioned above) between the pixels in order to screen the underlying active matrix circuitry and current/voltage leads. This black matrix gives rise to dark bands as shown in FIG. 9(b) if no special measures are taken, such as deliberately letting the views overlap, using a slanted lenticular, or using a non-integer number of views. All these methods of decreasing the effect of dark bands have disadvantages.

The invention enables dark bands to be removed by filling them with additional views. Dark bands occur when a slant angle of, for example, $\tan(\theta)=0$ or $\tan(\theta)=1/3$ is used.

Some LCD designs using in-plane switching of the LC material allow a frame rate of 100 Hz. There is a trend towards using LC effects that enable an even faster LC response (e.g. the so-called optically compensated birefringence (OCB) effect), enabling a frame rate of for example 180 Hz.

Examples of the hardware required to implement the invention as explained above will now be given. The examples below maintain the basic structure of FIG. 1, namely a light source, a display panel, and an imaging arrangement for providing directed light output.

A first example uses an electrically configurable barrier as shown in FIG. 10. In this case, barrier is an active-matrix monochrome LC panel with columns and/or rows of individually addressable pixels. When such a panel is used (in combination with polarizers) a re-configurable barrier pattern can be made.

The resolution of the matrix elements is smaller than the desired barrier pitch, so that different barrier configurations can be implemented. In the example of FIG. 10, the barrier matrix resolution is one eighth of the barrier pitch. The barrier matrix elements may have a pitch equal to the pixel pitch.

This can be used for example to enable switching of the barrier pattern from a pattern corresponding to a 2-view 3D display to that corresponding to a 4-view 3D display. FIG. 10 shows barrier patterns (for a 4-view display) based on a monochrome LCD with individually addressable columns or individually addressable pixels arranged in columns and rows.

Figure 10A:
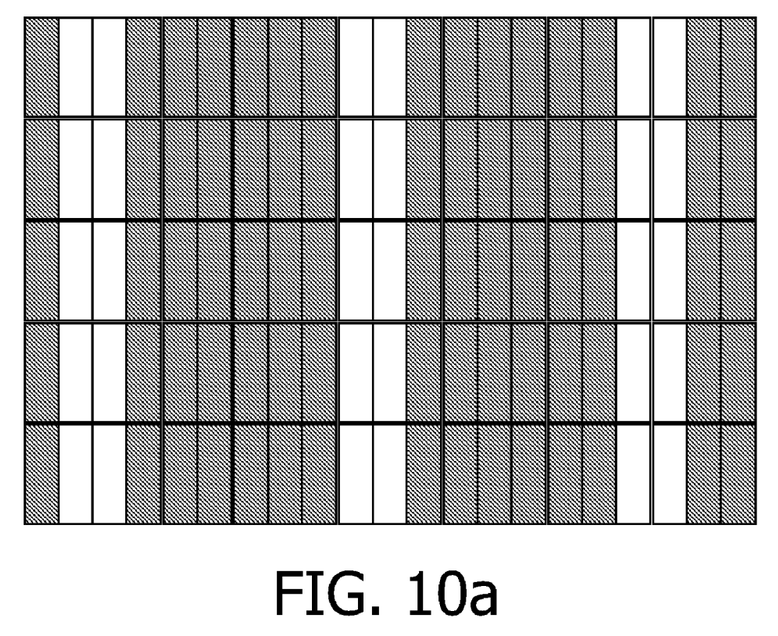
FIGS. 10(a) and (b) show a barrier arrangement of the invention and show how it is used.
Figure 10B:
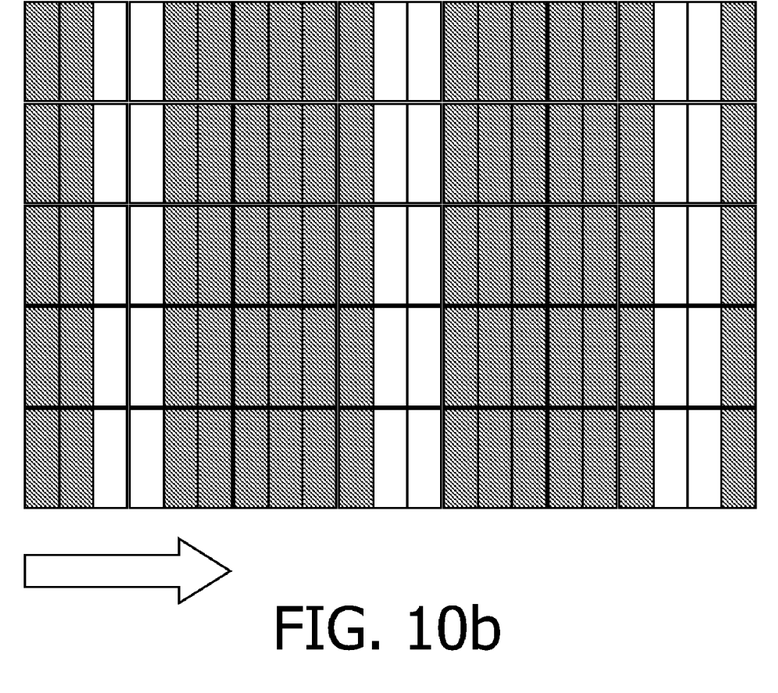

FIG. 10 shows that the barrier pattern can be shifted electronically, between the positions shown in FIG. 10(a) and FIG. 10(b) and shown by the arrow. Preferably, the column pitch equals half the (sub) pixel pitch of the image-forming element. This means the lens position can be moved by an amount equal to half of the (sub) pixel pitch.

Figure 11A:
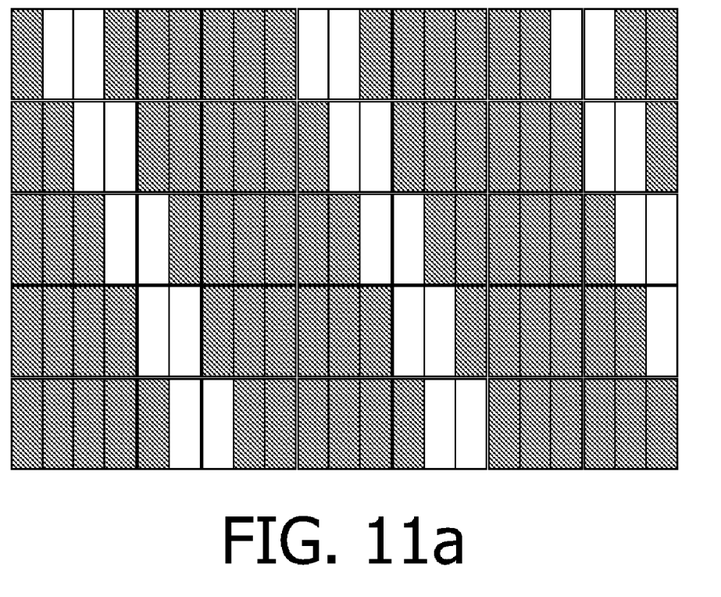
Figure 11B:
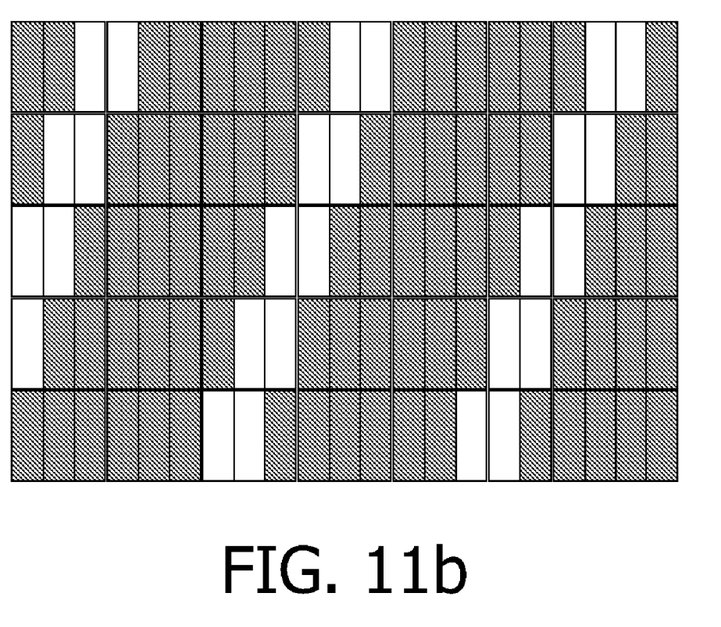

It is also possible to give the barrier pattern a slant angle as shown in FIG. 11. This can be advantageous since with this degree of freedom it is possible to distribute the resolution loss when viewing 3D between the horizontal and vertical directions, as explained above. As shown, the slant angle can also be reversed between views (frames). Rendering of the image on the display will then need to be changed accordingly.

The same effect as the active matrix barrier can be achieved by having a pixellated emissive panel to make a re-configurable pattern of lines emitting light. Such an emissive panel could for example be an organic LED (OLED) display.

The use of barrier patterns has the disadvantage of poor output efficiency. The same concept of re-configurability can however be applied to a lenticular lens array.

This approach is explained with reference to FIGS. 12 and 13, which show the use of graded-index (GRIN) lenses.

These lenses comprise a layer of LC material 90 sandwiched between electrodes layers 92,94 provided on glass plates 96,98.

The electrode layers have transparent electrode structures, for example formed of ITO. Each glass plate is provided with a polyimide layer which is rubbed, and the rubbing direction of the plate that is against the display (the back plate) matches the polarization direction of the light that leaves the display. The front plate rubbing direction is preferably the same to avoid polarization rotation and additional refraction in the 2D mode. In a preferred embodiment there is no twist in the LC material.

If there is no voltage difference across the LC cell, the cells are oriented parallel to the plane of the glass plates, and the LC cell is not active as it acts as a parallel layer. If there is a voltage difference across the cell, the LC molecules are oriented differently.

Figure 12A:
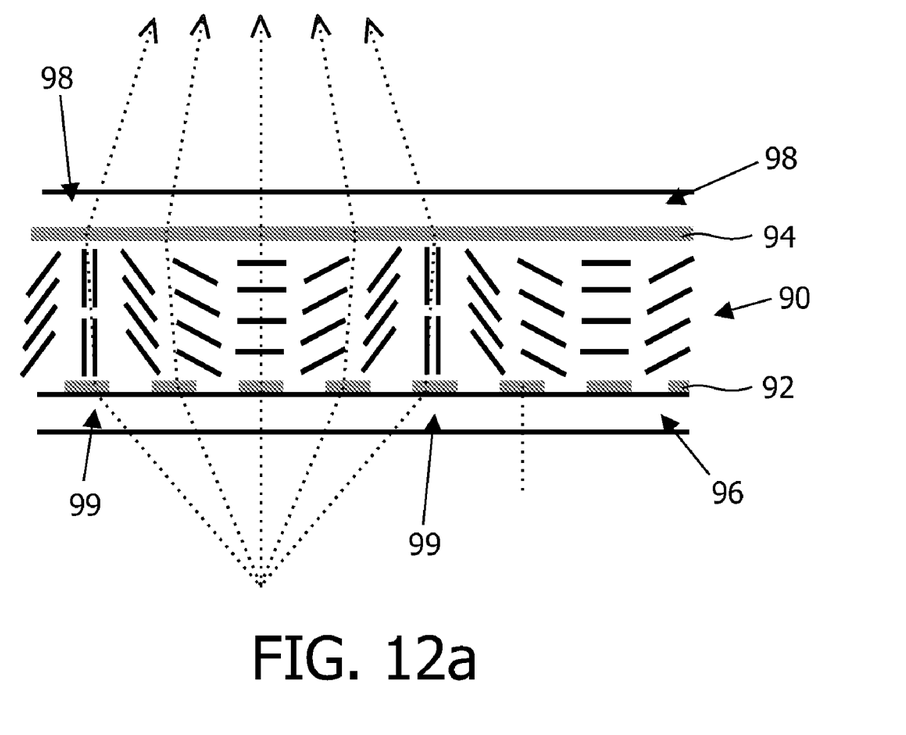
FIG. 12 shows an electrically controllable GRIN lens arrangement of the invention in two different control modes.
Figure 12B:
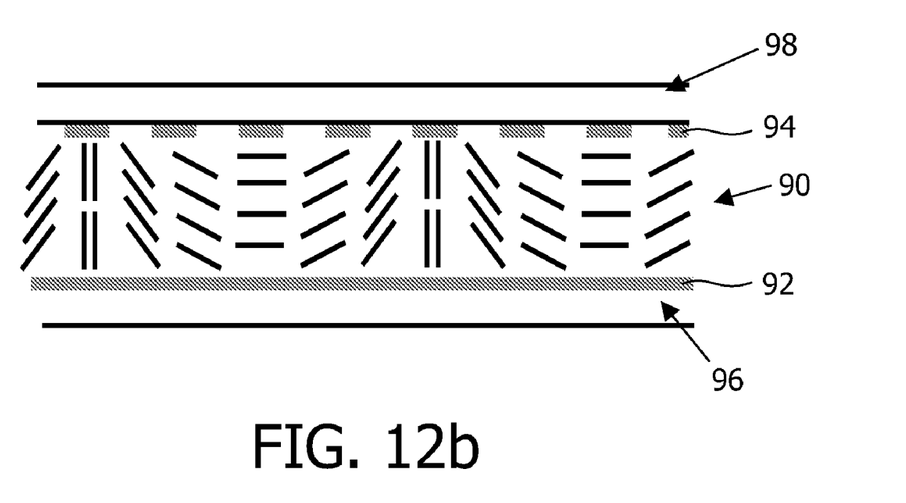

FIG. 12(a) shows the imaging device having a continuous top electrode layer and a segmented bottom electrode layer. As discussed below, the top electrode is also segmented but perpendicular to the bottom electrode layer so that the segments can not be seen in the figure.

Each electrode can be addressed individually for example by means of active matrix circuitry. By applying suitable potentials on the electrodes, it is possible to direct the molecules in the LC material such that the index of refraction acquires a profile that, in effect, results in a lens action, and this is a so-called graded-index (GRIN) lens. In FIG. 12, the two segmented electrodes 99 have opposite voltages applied which cause the LC molecules to align in the vertical direction. The electrodes in between are not switched, and the LC molecules are thus controlled to undergo a 180 degree twist between electrodes 99.

By controlling the distribution of electric potentials in the lateral direction between successive segmented electrodes, the effective lens shape and size can be altered. The dotted lines in FIG. 12(a) show the lens focusing function.

One of the electrode arrangements can comprise an array of electrodes in one direction, and the other can comprise an array of electrodes in a perpendicular direction. For example, FIG. 12(a) can be considered to be a cross section along the top electrode direction, and FIG. 12(b) can be considered to be a perpendicular cross section along the bottom electrode direction. By selecting which electrode pattern is to be driven as a single common electrode and which is to be individually addressed as a matrix array, the lens orientation can be controlled, for example to enable 90 degree display rotation of the display.

Figure 13A:
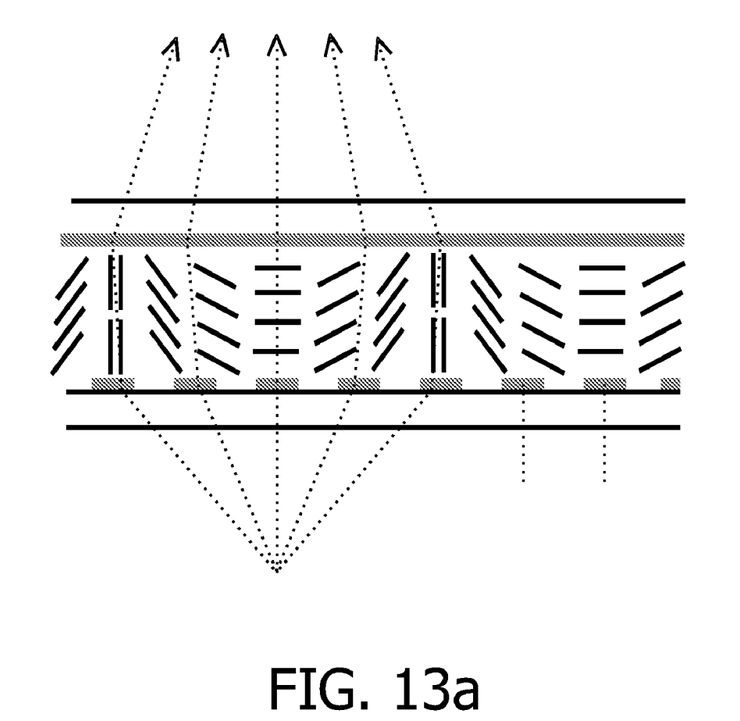
FIG. 13 shows how the lens arrangement of FIG. 12 can be controlled to provide the lens shift function of the invention.
Figure 13B:
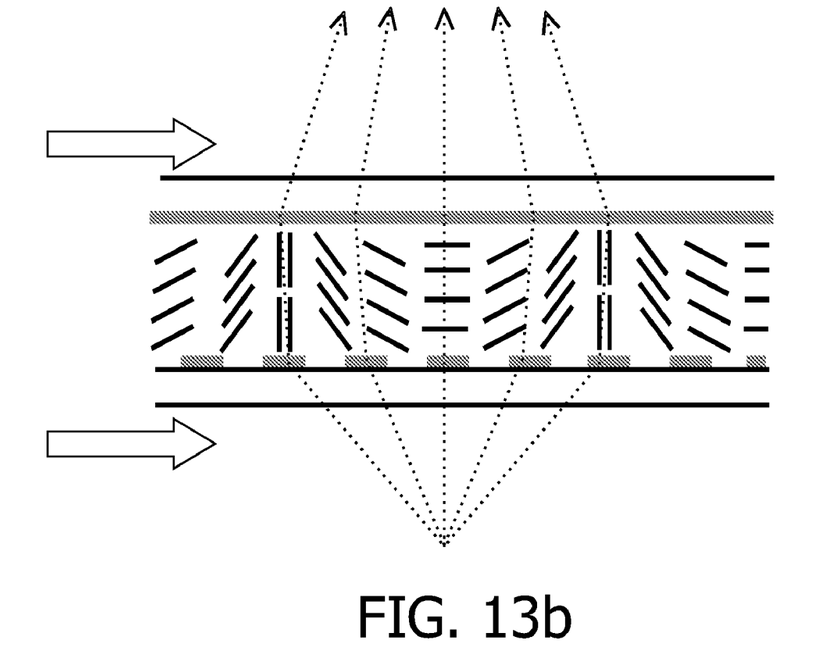

By displacing the potentials applied to the matrix electrode array, the position of the lens can be shifted in the lateral direction to provide the resolution increase or increase in views, and this is illustrated in FIG. 13, where a lateral shift is shown between FIGS. 13 (a) and (b).

Preferably, the electrode pitch is a fraction 1/n times half the pixel pitch of the image forming element (with n being an integer). This means the electrodes allow each lens position to be moved by increments of 1/n of the pixel pitch, where n is the number of different views to be made or represents the increase in resolution. Compared to FIG. 13(a), FIG. 13(b) is shifted to the right by the electrode pitch.

Only one segmented electrode array is required to enable a lateral shift, and the opposite electrode can be driven as a common layer, or can be physically designed as a non-structured electrode layer. Thus, the matrix of electrodes can be arranged on one side of the LC layer with on the other side a single counter electrode covering the whole LC layer. In addition to shifting the lens profile, the diameter and strength of the lens can be changed, albeit within boundaries. Thus, this device provides sufficient degrees of freedom in order to realize a re-configurable lenticular lens arrangement.

Instead of shifting the GRIN lenses, it is also possible to tune the potentials of the electrodes such that in effect a round lens augmented with a prism is obtained. The round lens part takes care of the focusing action whereas the prism part takes care of the tilt.

Figure 14A:
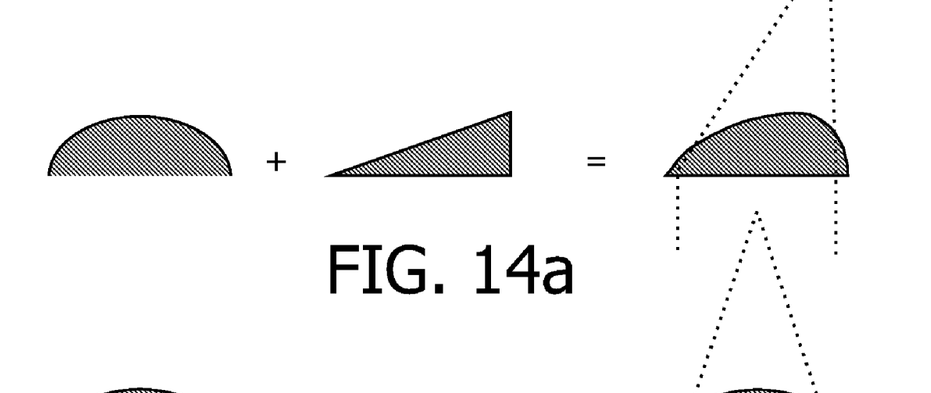
FIG. 14 shows other lens effects that can be achieved using the lenses of FIG. 12.
Figure 14B:
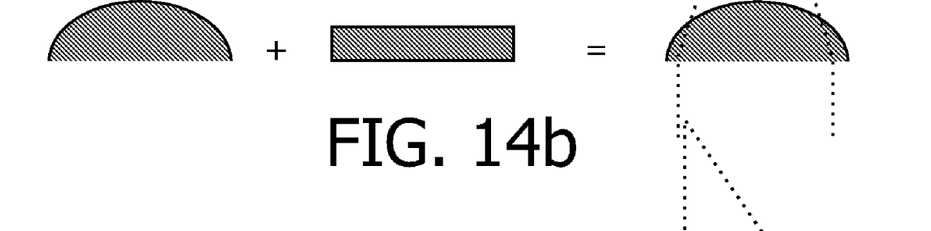
Figure 14C:
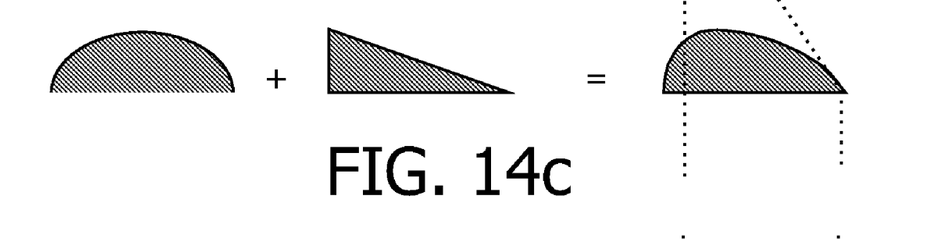
Figure 14D:
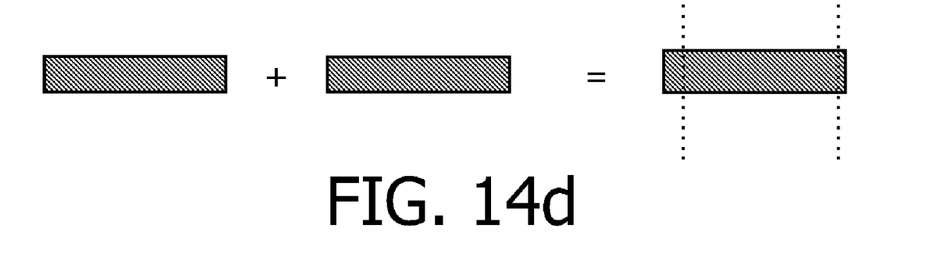

This is shown in FIG. 14, in which FIG. 14(a) shows a beam tilt to the right, FIG. 14 (b) shows the lens on and prism off providing no beam tilt. FIG. 14(c) shows beam tilt to the left and FIG. 14(d) shows the lens off and prism off for a 2D mode.

The examples above have discussed the 3D display modes as general image formats. It is also possible to switch various regions of the display to various 3D formats. An example is switching most of the display to a 2D mode and having a region of the display showing n-view images/video while having another region showing m-view images/video with n different to m.

The examples described above employ a liquid crystal display panel having, for example, a display pixel pitch in the range 50 μm to 1000 μm. However, it will be apparent to those skilled in the art that alternative types of display panel may be employed, such as organic light emitting diode (OLED) or cathode ray tube (CRT) display devices.

The manufacture and materials used to fabricate the display device have not been described in detail, as these will be conventional and well known to those skilled in the art.

The preferred example of controllable lens array has segmented row and column electrodes, but only segmented column electrodes are required to enable compatibility with multiple different views.

The reference to the pixel pitch above is intended to refer to the smallest display element, which may of course be a single color sub-pixel.

Various other modifications will be apparent to those skilled in the art.

The invention claimed is:

1. A switchable autostereoscopic display device comprising:
a display panel having an array of display pixel elements for producing a display, the display pixel elements being arranged in rows and columns; and
an electrically configurable graded lens array which directs the output from different pixel elements to different spatial positions to enable a stereoscopic image to be viewed, arranged such that display pixel outputs for both eyes of a viewer are simultaneously directed,
wherein the lens array is electrically switchable between at least two 3D modes, wherein the effective position of each lens in the lens array is shifted laterally between the modes with respect to the display pixel elements by an amount which is a non-integer multiple of the pitch between the pixel elements.

2. A device as claimed in claim 1, the amount of shift comprises half the pitch between the pixel elements.

3. A device as claimed in claim 1, wherein the display pixel elements comprise sub-pixels of a color pixel triplet.

4. A device as claimed in claim 1, wherein the imaging arrangement is further switchable to a 2D mode.

5. A device as claimed in claim 1, wherein the display panel comprises an array of individually addressable emissive, transmissive, refractive or diffractive display pixels.

6. A device as claimed in claim 1, wherein the display panel is a liquid crystal display panel.

7. A device as claimed in claim 1, wherein the imaging arrangement comprises a controllable light source device for illuminating the display panel.

8. A device as claimed in claim 1, wherein the imaging arrangement comprises a controllable light barrier device for controlling the light reaching the display panel from a backlight.

9. A device as claimed in claim 8, wherein the imaging arrangement comprises a matrix addressable liquid crystal light modulator device for providing an electrically controllable light absorption pattern to provide a light blocking function, thereby to implement a controllable light directing function.

10. A device as claimed in claim 1, wherein the lens array comprises a layer of liquid crystal material sandwiched between first and second electrode layers for controlling the potential across the liquid crystal layer.

11. A device as claimed in claim 10, wherein at least one of the electrode layers comprises an array of individually addressable parallel electrodes.

12. A device as claimed in claim 11, wherein the electrode pitch is a fraction of the pixel element pitch.

13. A device as claimed in claim 12, wherein the electrode pitch is half of the pixel element pitch.

14. A method of controlling an autostereoscopic display device comprising a display panel and an electrically configurable graded lens array for directing the display panel output to different spatial positions to enable a stereoscopic image to be viewed, the method comprising:

displaying a first set of views using the lens array, views for both eyes of a viewer being simultaneously displayed;

shifting the effective position of each lens in the lens array laterally with respect to the display pixel elements by an amount which is a non-integer multiple of the pitch between the pixel elements; and displaying a second set of views using the lens array, views for both eyes of a viewer being simultaneously displayed.

* * * * *